United States Patent
Chang et al.

(10) Patent No.: US 12,526,715 B2
(45) Date of Patent: Jan. 13, 2026

(54) RADIO LINK FAILURE REPORTING METHOD AND USER EQUIPMENT

(71) Applicant: Sharp Kabushiki Kaisha, Sakai (JP)

(72) Inventors: Ningjuan Chang, Shanghai (CN); Renmao Liu, Shanghai (CN)

(73) Assignee: SHARP KABUSHIKI KAISHA, Sakai (JP)

( * ) Notice: Subject to any disclaimer, the term of this patent is extended or adjusted under 35 U.S.C. 154(b) by 370 days.

(21) Appl. No.: 18/026,142

(22) PCT Filed: Sep. 14, 2021

(86) PCT No.: PCT/CN2021/118175
§ 371 (c)(1),
(2) Date: Mar. 14, 2023

(87) PCT Pub. No.: WO2022/057783
PCT Pub. Date: Mar. 24, 2022

(65) Prior Publication Data
US 2023/0362774 A1   Nov. 9, 2023

(30) Foreign Application Priority Data
Sep. 16, 2020   (CN) .......................... 202010976460.3

(51) Int. Cl.
*H04W 36/30* (2009.01)
*H04W 36/18* (2009.01)
(Continued)

(52) U.S. Cl.
CPC ......... *H04W 36/305* (2018.08); *H04W 36/18* (2013.01); *H04W 36/362* (2023.05); *H04W 76/20* (2018.02)

(58) Field of Classification Search
CPC . H04W 36/305; H04W 36/18; H04W 36/362; H04W 76/20; H04W 36/00833;
(Continued)

(56) References Cited

U.S. PATENT DOCUMENTS

| | | | |
|---|---|---|---|
| 2023/0156539 A1* | 5/2023 | Wu | H04W 76/19 370/331 |
| 2023/0189092 A1* | 6/2023 | Wang | H04W 76/19 370/331 |

(Continued)

FOREIGN PATENT DOCUMENTS

| | | | |
|---|---|---|---|
| WO | 2020/156497 A1 | 8/2020 | |
| WO | WO-2020163991 A1 * | 8/2020 | ........... H04L 43/065 |
| WO | 2022086381 A1 | 4/2022 | |

OTHER PUBLICATIONS

Official Communication issued in International Patent Application No. PCT/CN2021/118175, mailed on Dec. 14, 2021.

(Continued)

*Primary Examiner* — Hashim S Bhatti
(74) *Attorney, Agent, or Firm* — Keating & Bennett, LLP

(57) ABSTRACT

The present disclosure provides a radio link failure reporting method and user equipment. The radio link failure reporting method includes: detecting, by user equipment (UE), occurrence of a radio link failure (RLF); and storing, by the UE, radio link failure information in an RLF report, wherein if the UE has performed a handover procedure before the RLF, the radio link failure information includes: information for indicating the type of the handover procedure; a global cell identity and a tracking area code of a cell where the latest handover command was received; and an elapsed time starting from reception of the latest handover command.

2 Claims, 3 Drawing Sheets

(51) Int. Cl.
H04W 36/36 (2009.01)
H04W 76/20 (2018.01)

(58) Field of Classification Search
CPC .. H04W 36/0079; H04W 24/08; H04W 24/10
See application file for complete search history.

(56) References Cited

U.S. PATENT DOCUMENTS

| | | | | |
|---|---|---|---|---|
| 2023/0262540 A1* | 8/2023 | Kim | ........... | H04W 36/362 370/216 |
| 2023/0284113 A1* | 9/2023 | Wu | ........... | H04W 76/30 370/331 |

OTHER PUBLICATIONS

"3rd Generation Partnership Project; Technical Specification Group Radio Access Network; NR: Radio Resource Control (RRC) protocol specification (Release 16)", 3GPP TS 38.331 V16.1.0, Jul. 2020, pp. 1-906.

"3rd Generation Partnership Project; Technical Specification Group Radio Access Network; Evolved Universal Terrestrial Radio Access (E-UTRA); Radio Resource Control (RRC); Protocol specification (Release 16)", 3GPP TS 36.331 V16.1.1, Jul. 2020, pp. 1-1078.

CATT, "Discussion on CHO and DAPS Mobility Enhancement", 3GPP TSG-RAN WG2 Meeting #112 electronic, R2-2008844, Nov. 2-13, 2020, pp. 1-6.

CMCC, "New WID on enhancement of data collection for SON/MDT in NR", 3GPP TSG RAN Meeting #86, RP-193255, Dec. 9-12, 2019, 5 pages.

Lenovo et al., "MRO for CHO and DAPS Handover", 3GPP TSG-RAN WG2 Meeting #111e, R2-2007465, Aug. 17-28, 2020, 4 pages.

Ericsson, "SON Scope and Requirements for Rel. 17", 3GPP TSG-RAN WG2 #111e, R2-2007661, Aug. 17-28, 2020, 10 pages.

Ericsson, "Summary of AI 8.13.2-SON, RAN2 scope and requirements", 3GPP TSG-RAN WG2 #111-e, R2-2007662, Aug. 17-28, 2020, 26 pages.

Huawei et al., "Discussion for RAN2 SON scope and requirements", 3GPP TSG-RAN WG2 Meeting #111 electronic, R2-2007769, Aug. 17-28, 2020, 9 pages.

* cited by examiner

RADIO LINK FAILURE REPORTING METHOD AND USER EQUIPMENT

TECHNICAL FIELD

The present disclosure relates to the technical field of wireless communications. More specifically, the present disclosure relates to a method for recovery after a radio link failure, and corresponding user equipment.

BACKGROUND

Network optimization can be performed in a wireless network to achieve the goal of optimizing network performance. Generally, techniques such as data acquisition and data analysis are used to ascertain the causes of poor network quality in existing deployed and operating networks, and techniques such as modifying configured network parameters and adjusting the network structure and deployed devices are adopted to improve network performance. In a self-configuration and self-optimization network (SON), optimization refers to a process of automatically adjusting the network on the basis of measurement/performance measurement of user equipment and/or a base station. The network side can configure the UE to perform measurement for a SON. There are many SON functions, for example, an Automatic Neighbour Relation (ANR) function for reducing the neighbour management burden of an operator, a Mobility Load Balancing (MLB) function for balancing loads between different cells, a Mobility Robustness Optimization (MRO) function for optimizing mobility performance, a random access channel optimization function for optimizing random access channel parameters, and a radio link failure report function for optimizing coverage and MRO.

A new research project on 5G technology standards (see non-patent literature: RP-193255: New WID on enhancement of data collection for SON/MDT in NR) was approved in the 3rd Generation Partnership Project (3GPP) RAN #86 plenary session held in April 2019. One of the research purposes is to implement the SON function in an NR system of Release 16 in a new access or mobility mechanism such as a Conditional Handover (CHO) and a Dual Active Protocol Stack (DAPS) handover.

The present disclosure aims to implement the SON function in an NR system of Release 16 in a new mobility mechanism, and further, proposes a solution to the issue of how to set the content of a radio link failure report in CHO or DAPS scenarios.

SUMMARY

The objective of the embodiments of the present disclosure is to report a radio link failure in an NR system of Release 16 in a new mobility mechanism such as a CHO or DAPS mechanism. More specifically, the present disclosure proposes a solution to the issue of how to set relevant link failure information in a radio link failure report when a radio link failure occurs in a handover scenario where a CHO mechanism or DAPS mechanism has been executed. The embodiments of the present disclosure provide a radio link failure reporting method performed in user equipment, and corresponding user equipment.

According to a first aspect of the present disclosure, provided is a radio link failure reporting method, comprising: detecting, by user equipment (UE), a radio link failure (RLF); and storing, by the UE, radio link failure information in an RLF report, wherein if the UE has performed a handover procedure before the RLF, the radio link failure information comprises: information for indicating the type of the handover procedure; a global cell identity and a tracking area code of a cell where the latest handover command was received; and an elapsed time starting from reception of the latest handover command In the radio link failure reporting method according to the first aspect, the radio link failure information may be stored in a variable VarRLF-Report corresponding to the RLF report.

In the radio link failure reporting method according to the first aspect, the UE may set, in the RLF report, a field comprising the information for indicating the type of the handover procedure, the RLF report comprises a previous-PCellId information element set to the global cell identity and the tracking area code of the cell where the latest handover command was received, and the RLF report comprises a timeConnFailure information element set to the elapsed time starting from reception of the latest handover command In the radio link failure reporting method according to the first aspect, the UE may receive a time threshold Th from a network side via an RRC message, wherein if a time indicated by the timeConnFailure information element is less than or equal to the time threshold Th, the UE includes the information for indicating the type of the handover procedure in the RLF report, and if the time indicated by the timeConnFailure information element is greater than the time threshold Th, the UE does not include the information for indicating the type of the handover procedure in the RLF report.

In the radio link failure reporting method according to the first aspect, the information for indicating the type of the handover procedure indicates that the type of the handover procedure may be: a conditional handover (CHO), a dual active protocol stack (DAPS) handover, or a legacy handover.

In the radio link failure reporting method according to the first aspect, if the information for indicating the type of the handover procedure is not present, it may be indicated that the type of the handover procedure is the legacy handover.

In the radio link failure reporting method according to the first aspect, the RLF report may further comprise: a failed cell identity set to a cell identity of a cell where the RLF is detected; a connection failure type (connectionFailureType) information element set to rlf; and a UE identity C-RNTI set to a C-RNTI used by the UE in a primary cell.

In the radio link failure reporting method according to the first aspect, when the handover command is a CHO handover command, a DAPS handover command, or a CHO link recovery command, the information for indicating the type of the handover procedure is set to a value corresponding to each command; if the handover procedure performed by the UE before the RLF is a CHO handover, the information for indicating the type of the handover procedure is set to indicate a CHO handover; if the handover procedure performed by the UE before the RLF is a DAPS handover, the information for indicating the type of the handover procedure is set to indicate a DAPS handover; and if the handover procedure performed by the UE before the RLF is a conditional handover (CHO) for link recovery, the information for indicating the type of the handover procedure is set to indicate CHO link recovery.

In the radio link failure reporting method according to the first aspect, the RLF may be a master cell group (MCG) RLF or a secondary cell group (SCG) RLF, and the handover procedure may be a synchronized reconfiguration procedure of a primary cell (PCell) or a synchronized reconfiguration procedure of a primary secondary cell (PSCell).

According to a second aspect of the present disclosure, provided is user equipment (UE), comprising: a processor; and a memory storing instructions, wherein the instructions, when run by the processor, perform the radio link failure reporting method described herein.

BRIEF DESCRIPTION OF THE DRAWINGS

In order to understand the present disclosure and advantages thereof more fully, reference will now be made to the following description made in conjunction with the accompanying drawings.

In the drawings, identical or similar structures are marked by identical or similar reference numerals.

DETAILED DESCRIPTION

Figure 1:
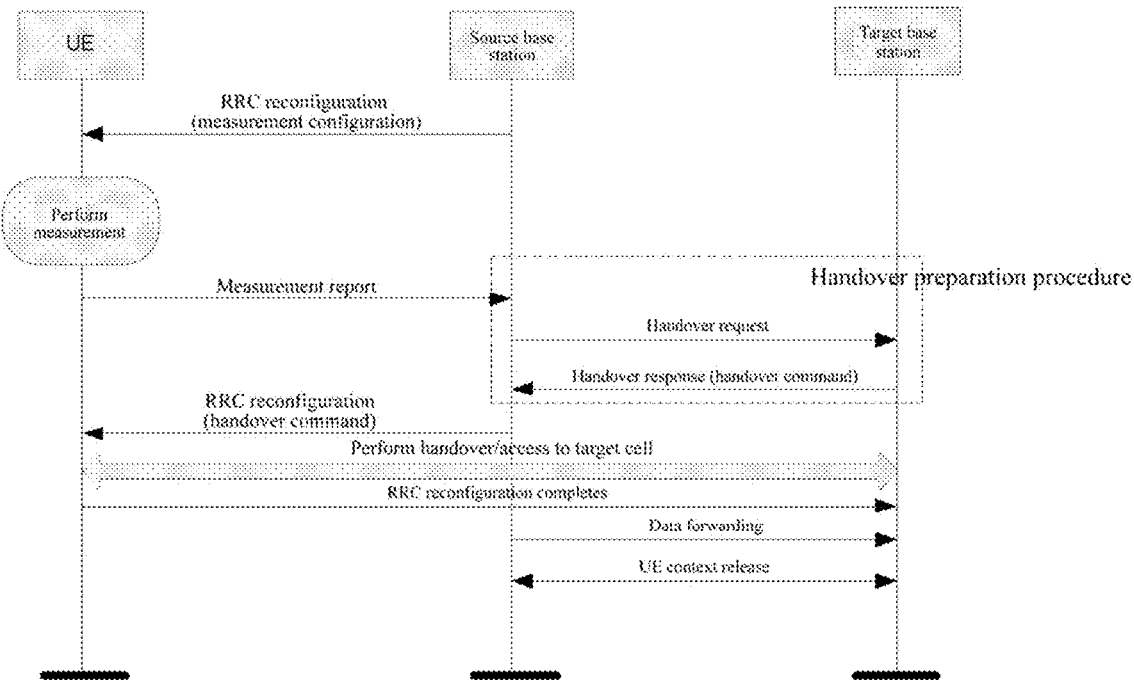
FIG. 1 is a sequence diagram showing how user equipment (UE) in a connected state changes a serving cell by means of a handover procedure.

According to the following detailed description of exemplary embodiments of the present disclosure made in conjunction with the accompanying drawings, other aspects, advantages, and prominent features of the present disclosure will become apparent to those skilled in the art.

In the present disclosure, the terms "include" and "comprise" and derivatives thereof mean inclusion without limitation; the term "or" has an inclusive meaning and means "and/or".

In the present specification, the following various embodiments for describing the principles of the present disclosure are merely illustrative, and should not be interpreted in any way as limiting the scope of the disclosure. The following description with reference to the accompanying drawings is used to facilitate full understanding of the exemplary embodiments of the present disclosure defined by the claims and equivalents thereof. The following description includes a variety of specific details to facilitate understanding, but these details should be considered merely exemplary. Therefore, those of ordinary skill in the art should recognize that various changes and modifications may be made to the embodiments described herein without departing from the scope and spirit of the present disclosure. In addition, the description of the known function and structure is omitted for clarity and simplicity. In addition, the same reference numerals are used for similar functions and operations throughout the accompanying drawings.

A plurality of embodiments according to the present disclosure are specifically described below by using a Long Term Evolution (LTE)/NR mobile communication system and subsequent evolved versions thereof as an exemplary application environment. However, it is to be noted that the present disclosure is not limited to the following embodiments, but may be applied to other wireless communications systems. In the present disclosure, unless otherwise specified, the concept of a cell and the concept of a base station are interchangeable. An LTE system may also refer to a 5G LTE system and a post-5G LTE system (such as an LTE system referred to as an eLTE system or an LTE system that can be connected to a 5G core network). In addition, the LTE can be replaced with an evolved universal terrestrial radio access (E-UTRA) or an evolved universal terrestrial radio access network (E-UTRAN). In the present disclosure, a handover refers to change of a primary cell initiated by a network side, the change including inter-cell change of the primary cell and intra-cell change of the primary cell. That is, the primary cell of UE is changed from a source cell to a target cell, where the source cell and the target cell may be the same cell or different cells. In this procedure, a security key or a security algorithm for access layer security may also be accordingly updated. The source cell is also referred to as a source base station, or may also be a source beam, a source transmission point (TRP), or a source master cell group (MCG). The target cell may also be referred to as a target base station, or may also be a target beam, a target transmission point, or a target MCG. The source cell refers to a cell connected to serve the UE before a handover procedure is initiated, that is, a cell from which the UE receives an RRC message including a handover command The target cell refers to a cell connected to serve the UE after the handover procedure is successfully completed, or a cell indicated by a target cell identity included in the handover command, or a cell that the UE accesses when being instructed to execute a handover. However, practically, the present disclosure may also be applied to a primary secondary cell (PSCell) change in a dual connectivity (DC) configuration. In this case, the handover refers to the PSCell change, the source cell refers to a source PSCell or a source secondary cell group (SCG), and the target cell refers to a target PSCell or a target SCG. The handover command described in the present disclosure is used to trigger the UE to execute a handover, and is an RRC reconfiguration message including a synchronized reconfiguration (Reconfigurationwithsync) information element in an NR system. Still further, for handover of a primary cell, the handover command is an RRC reconfiguration message including a synchronized reconfiguration (Reconfigurationwithsync) information element for a master cell group (MCG). In this case, the handover may also be referred to as an MCG synchronized reconfiguration. In an LTE system, the handover command is an RRC connection reconfiguration message including a mobility control information (MobilityControlInformation) information element. The synchronized reconfiguration information element or the mobility control information information element includes configuration information of the target cell, for example, a target cell identifier, a target cell frequency, common configurations of the target cell such as system information, a random access configuration used by the UE to access the target cell, a security parameter configuration of the UE in the target cell, a radio bearer configuration of the UE in the target cell, and the like. For simplicity of description, in the present disclosure, the RRC reconfiguration message is equivalent to the RRC connection reconfiguration message; similarly, an RRC reconfiguration complete message serving as a response message thereto is equivalent to an RRC connection reconfiguration complete message. The handover command is equivalent to the RRC message including the handover command, and refers to an RRC message or a configuration in the RRC message triggering the UE to execute a handover. The handover configuration refers to all or part of configurations in the handover command "Cancel", "release", "delete", "flush", and "clear" are interchangeable. "Execute", "use", and "apply" are interchangeable. "Configure" and "reconfigure" are interchangeable. "Link" and "connection" are interchangeable. "Monitor" and "detect" are interchangeable.

The prior art involved in the embodiments of the present disclosure will be briefly described below.

General Handover Procedure in Existing Mechanism:

User mobility in a connected state is implemented mainly via a handover procedure, and the handover refers to a procedure in which UE in a radio resource control (RRC) connected state changes a serving cell. FIG. 1 is a sequence diagram showing how user equipment (UE) in a connected state changes a serving cell by means of a handover procedure. As shown in FIG. 1, the handover procedure generally includes the following phases:

In phase 1, a measurement phase, a base station issues a measurement configuration to user equipment (UE); the UE measures, on the basis of the measurement configuration, a radio link corresponding to a serving cell or a neighboring cell; when a configured measurement reporting condition is met, the UE transmits a measurement report to the base station. The measurement phase is not mandatory, and the base station may also perform a blind handover for the UE if the base station does not have any valid measurement report.

In phase 2, a handover preparation phase, the base station determines, according to the received measurement report and other factors such as load of the base station, whether to trigger a handover for the UE. If it is determined that a handover is triggered for the UE, then a source base station initiates a handover preparation procedure by transmitting a handover request message to a target base station. The target base station determines, according to the context of the UE in the handover request message, available resources of the target base station, and other factors, whether to accept the present handover request for the UE. If so, then the target base station replies to the source base station with a handover acknowledgment message, wherein the handover acknowledgment message includes an inter-node RRC message, namely, a handover command.

In phase 3, a handover execution phase, the source base station issues the handover command to the UE, and starts to forward data of the UE to the target base station. The UE, upon receiving the handover command, immediately uses a configuration in the handover command to execute a handover, accesses the target base station by means of a random access procedure, and transmits an acknowledgment message to the target base station. The random access procedure is not mandatory.

In phase 4, a handover completion phase, after confirming that the UE has successfully accessed the target base station, the target base station transmits a handover complete message to the source base station. According to the handover complete message, the source base station may release the UE context stored thereon.

The UE detects the handover procedure by using a timer T304. When the handover procedure is initiated, the UE starts the timer T304. When the handover procedure is completed, the UE stops the timer T304. When T304 expires, the UE considers that the handover has failed.

Figure 2:
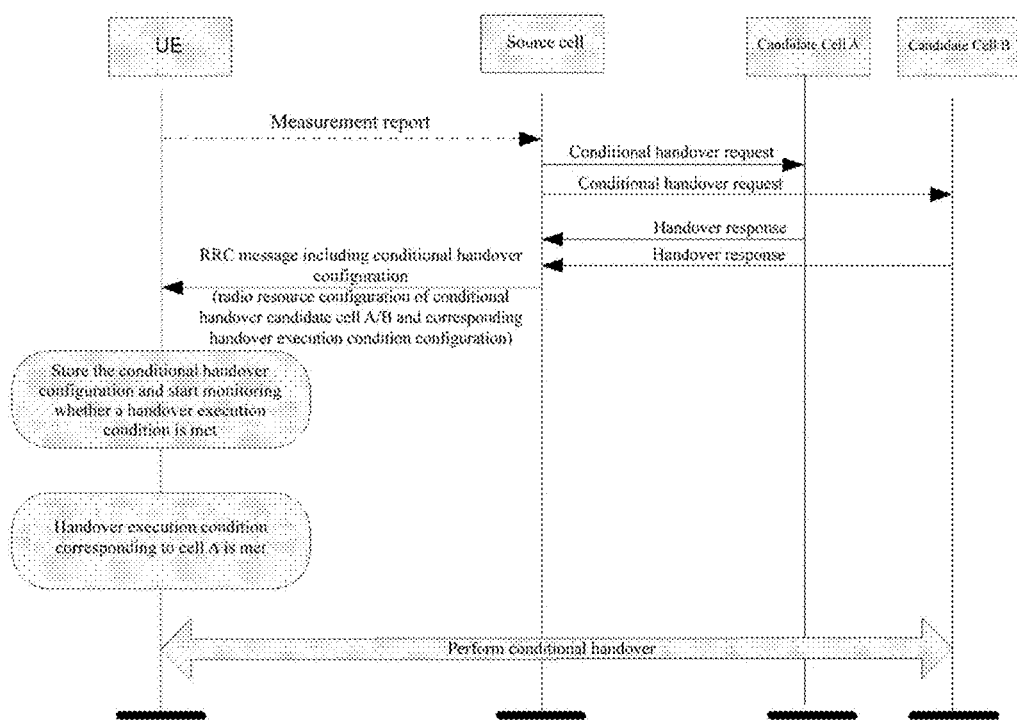
FIG. 2 is a schematic flow diagram of a conditional handover.

Conditional Handover:

Secondly, the conditional handover is briefly described. As described above, regarding technical requirements of Release 16, it is required to meet a data interruption delay time of "0 ms" as much as possible in a mobility handover procedure and to improve handover robustness so as to meet mobility requirements for a seamless handover in the NR. In the current handover procedure, one reason for a handover failure and therefore a long data transmission interruption is a handover command receiving failure caused when the handover command is not delivered in a timely manner A feasible method to address this problem is a condition-based handover (referred to simply as a conditional handover). FIG. 2 is a schematic flow diagram of a conditional handover. In the conditional handover, a relatively conservative measurement report threshold is set, so that a base station acquires a measurement result in advance, and performs handover preparation with a selected target base station in advance according to the measurement result. In this case, the base station can issue a handover command including a handover candidate cell and a handover execution condition to UE before an actual handover condition (relative to the conservative measurement report threshold) is met, wherein the handover command carries a condition for executing a handover by the UE. Different from existing handover mechanisms, after receiving the conditional handover command, the UE does not execute a handover immediately but stores a received handover command configuration, and starts to monitor the link quality of a source cell or the link quality of a target cell according to the handover execution condition carried in the handover command message, so as to evaluate whether the handover execution condition is met. Only when it is determined, by means of monitoring, that the configured handover execution condition is met, does the UE start to execute the stored handover command and access the target cell. In summary, the conditional handover refers to a handover procedure that is executed only when one or more configured handover execution conditions are met. As for the handover execution condition, for example, the handover execution condition is a measurement event; for example, the condition is conditional reconfiguration measurement event A3 (the signal quality of a neighboring cell is superior to that of a serving cell by an offset value for a continuous period of time). The neighboring cell corresponds to the target cell for the handover. Generally, all of the measurement events defined in current 3GPP standard specifications 36.331 and 38.331 (see section 5.5.4), such as A1-A5, can be included in the conditional handover command as the handover execution condition. Because the handover command is included in the RRC reconfiguration message, the conditional handover CHO is also referred to as conditional reconfiguration.

Link Failure Reporting Function in Existing Mechanism:

In a current LTE system and a current NR system of Release 16, UE will generate and store a radio link failure report (RLF report) when a radio link failure (RLF) or handover failure (HOF) occurs, and store radio link failure information in a UE variable VarRLF-Report. After a connection to a network side (e.g., through an RRC re-establishment procedure or an RRC establishment procedure for establishing a new connection) is recovered, the UE can inform the network side by using an RRC message that there is an available radio link failure report thereon (indicated by an rlf-InfoAvailable information element). For example, the UE can inform the network side that the UE has a stored available radio link failure report in an RRC connection re-establishment complete message (RRCConnectionReestablishmentComplete) in an RRC connection re-establishment procedure, in an RRC connection re-configuration complete message (RRCConnectionReconfigurationComplete) in an RRC connection re-configuration procedure, in an RRC connection setup complete message (RRCConnectionSetupComplete) in an RRC connection setup procedure, or in an RRC connection resume complete message (RRCConnectionResumeComplete) in an RRC connection resume procedure. After receiving the indication, the network side may request, by using an RRC message (an rlf-ReportReq information element in a UEInformationRequest message being used to indicate the request), the UE to report the radio link failure report stored thereby. The UE will report the stored radio link failure report (an rlf-Report information element in a UEInformationResponse message) to the network side in a response RRC message. The radio link failure report obtained by the network side is used for network optimization, such as the optimization of network coverage and mobility robustness. The radio link failure report may include: measurement results of a source cell and neighboring cell(s) available when a link fails, location information, the identity of a primary cell where the link failure occurs, the type of the link failure (RLF or HOF), an RLF cause, an elapsed time between the connection failure and reporting of the radio link failure, an elapsed time between reception of a last handover command and the connection failure (referred to as a timeConnFailure information element), the identity of a cell for the UE to re-access the network, i.e., an RRC re-establishment cell identity, etc.

Radio Link Recovery Function Using Stored Conditional Handover Configuration:

After the UE is configured with a conditional handover, the UE does not execute a handover immediately, but executes the handover according to a received or stored conditional handover configuration after a corresponding condition is met. During a period from the time when the UE receives the conditional handover configuration to the time when the UE executes the handover according to the received conditional handover configuration, the UE still maintains communication with the source base station. During this period, a radio link failure (RLF) between the UE and the source base station may occur. A link recovery enhancement mechanism is introduced to the NR system of Release 16 or the LTE system: when an RLF or HOF occurs, the UE selects, via a cell selection procedure in an RRC connection re-establishment procedure (i.e., when a timer T311 runs), a cell to perform link recovery. If the UE is configured with an enable instruction to perform a CHO after the link failure, and if the cell selection procedure is caused by detection of an MCG RLF or MCG handover failure (i.e., the synchronized reconfiguration failure in the NR system) and the selected cell is a conditional handover candidate cell (a synchronized reconfiguration information element reconfigurationWithSync corresponding to the cell is included in a MasterCellGroup information element of a stored conditional reconfiguration variable), then the UE performs the handover to the cell according to the conditional handover configuration corresponding to the cell; otherwise, the UE attempts to recover the connection to the network side by transmitting an RRC connection establishment request to a selected cell. In the present disclosure, this enhanced link recovery function is referred to as a link failure recovery function based on a conditional handover configuration (for simplicity of description, this function is simply referred to as a conditional handover link recovery function). The network side enables this function of the UE by setting a CHO recovery information element (referred to as an attemptCondReconfig information element) in a CHO configuration to true, so as to indicate to the UE that the UE needs to perform the conditional handover to recover the link after the failure if the selected cell is a target candidate cell and the selection is the first cell selection after the failure. For the UE with this function enabled, if a cell selected in a first cell selection procedure after an RLF/HOF is a target candidate cell, the UE can execute a CHO to this cell. In a Release 16 system, the UE, after the failure, is only allowed to execute CHO recovery once. The conditional handover candidate cell refers to a (target) cell in a conditional handover configuration in an RRC message received by the UE and used to configure a conditional handover, i.e., a cell indicated by a cell identity in a synchronized reconfiguration information element (ReconfigurationWithSync) or a mobility control information element (MobilityControlInfo). The network side may configure one or more conditional handover execution candidate cells for the UE at the same time.

DAPS Handover:

In the DAPS mechanism introduced to the NR system of Release 16 or the LTE system, after receiving a handover command, the UE does not cut off a link (data transmission) to a source base station in a handover procedure to access a target base station, but rather, the UE can maintain connection and data transmission to the target base station and the source base station at the same time, thereby avoiding a delay caused by service interruption due to disconnection to the source base station before accessing the target base station. The DAPS handover refers to a handover procedure in which UE, after receiving an RRC message for handover, still maintains a connection to a source base station until the source base station is released after a random access procedure for a target base station is successfully performed. In this procedure, the UE continues receiving downlink data from the source base station until the source base station is released, and the user continues transmitting uplink data to the source base station until the random access procedure to the target base station is successfully completed. After the random access procedure to the target base station is completed, a MAC layer indicates to an upper layer that the random access procedure is completed, and after receiving the indication, an RRC layer instructs a lower layer (e.g., a PDCP layer) to perform an uplink data switch, so as to switch an uplink path from the source base station to the target base station.

Figure 3:
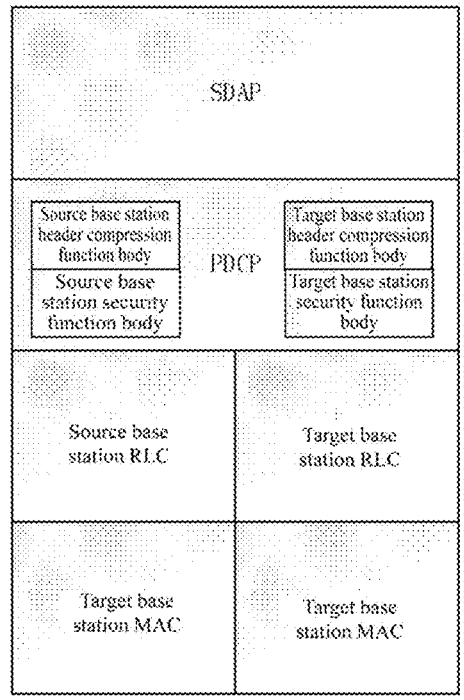
FIG. 3 is a schematic diagram showing how UE maintains active protocol stacks for a source base station and a target base station at the same time in a DAPS handover procedure.

In the case of the DAPS handover, after receiving a handover command, the UE establishes a MAC entity for the target base station. If a DRB is configured as a DAPS bearer, the UE establishes for the DRB an RLC entity and a dedicated traffic logical channel (DTCH) associated with the target base station, reconfigures a PDCP entity associated with the DAPS bearer as a DAPS PDCP entity which is a PDCP entity that has security and robust header compression (ROHC) functions respectively associated with the source base station and the target base station, and respectively associates the security and ROHC functions with corresponding RLC entities configured for the source base station and the target base station. In the above manner, as shown in FIG. 3, in the DAPS handover procedure, the UE maintains active protocol stacks for the source base station and the target base station at the same time.

When the DAPS handover fails, that is, when a timer T304 used to monitor the handover procedure expires, if no radio link failure is detected at the source base station, the UE falls back to the connection to the source base station, and reports the DAPS handover failure via the source base station, instead of triggering an RRC connection re-establishment procedure. Otherwise, if a radio link failure is detected at the source base station or has already occurred, the UE recovers the link to the network by initiating an RRC connection re-establishment procedure.

For mobility robustness optimization, there are several typical types: a too late handover, which occurs typically due to that the handover command is delivered too late, and the consequent failure of the UE to timely receive the handover command results in the RLF in the source cell; a too early handover, which occurs typically due to that setting of the handover related parameter is too conservative, and the consequent execution of the handover by the UE before reaching the handover region may result in occurrence of the HOF during the handover procedure, or occurrence of the RLF shortly after the successful handover to the target cell; and a handover to the wrong cell, which occurs due to improper configuration of handover parameters between different cells, and the consequent selection of the wrong target cell by the UE may result in occurrence of the RLF shortly after the successful handover of the UE to the target cell, and selection of another cell different from the target cell to perform the RRC re-establishment in the subsequent link recovery procedure, e.g., the RRC re-establishment process.

It can be seen from the above that new handover mechanisms such as CHO and DAPS, rather than a legacy handover mechanism, are introduced to the NR system of Release 16 or the LTE system. The handover parameter configurations, such as the measurement reporting threshold, the value of the handover procedure detection timer T304, etc., used in the new handover mechanisms may be configured to be different from the corresponding parameters in the legacy handover mechanisms. That is, it may be considered that each of the different handover mechanisms (scenarios) has a set of handover related parameters. As a result, when the mobility performance parameter optimization is performed at the network side, different handover mechanisms (scenarios) need to be treated differently. Computation is performed separately for handover performance auxiliary information (such as an RLF report) acquired from the UE in different handover mechanisms (scenarios), and the handover related parameters corresponding to the corresponding handover mechanisms (scenarios) are evaluated and adjusted on the basis of different computation data, so that the network optimization is more refined.

It is considered that in a scenario, the UE performs a handover procedure from a cell A to a cell B. Within a very short period of time following the successful handover to the cell B, an RLF occurs at the cell B, and the UE sets and stores relevant information of the RLF, i.e., an RLF report. After the RLF, the UE recovers the link connection to the network side via RRC connection re-establishment or RRC connection establishment or other methods. The UE indicates to the network side that an available RLF report is stored thereon. At a certain time later, the network side transmits an RLF report request to the UE via an RRC message, requesting the UE to report the stored RLF report. The UE transmits the stored RLF report to the network side on the basis of the request. The network side can determine, on the basis of the content of the RLF report, that the RLF in this case is actually caused by a previous improper handover from the cell A to the cell B (for example, a too early handover, or a handover to the wrong cell), and therefore adjust the handover related parameters between the cell A and the cell B. On the other hand, the network side determines when to transmit the request. That is, the network side determines when to acquire the stored RLF report from the UE. Thus, in one scenario, when the network side (e.g., the cell A or the cell B) acquires the RLF report, the network side may have discarded the UE context information. On the basis of the information of the RLF report in the existing mechanism, the network side cannot determine which type of handover procedure (e.g., the legacy handover, CHO, or DAPS) is the previous handover associated with the RLF report, which may result in incorrect handover parameter adjustment.

Several embodiments of the present disclosure are described in detail below. The following embodiments are merely examples provided to facilitate understanding of the present invention, and are not intended to limit the present invention.

EMBODIMENT 1

Figure 4:
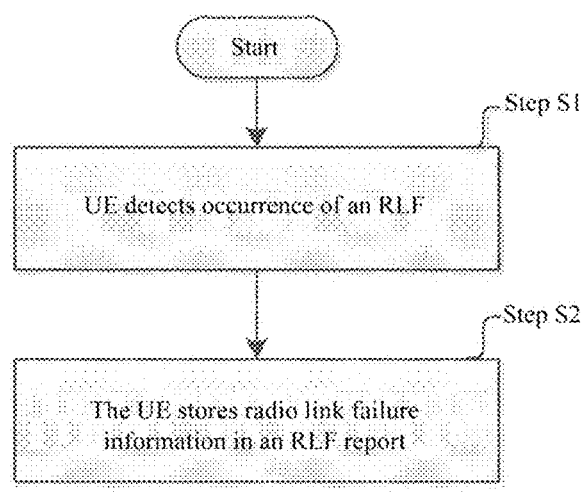
FIG. 4 is a schematic diagram showing a process flow of a radio link failure reporting method in Embodiment 1 of the present disclosure.

Embodiment 1 of the present disclosure will be described in detail below. This embodiment provides a method used by UE to transmit an RLF report to a network. When the UE detects occurrence of an RLF, and when the UE stores the RLF report in an RLF report (VarRLF-Rreport variable), content in the RLF report may be set in the following manner As an example, FIG. 4 is a schematic diagram showing a process flow of a radio link failure reporting method in Embodiment 1 of the present disclosure.

As shown in FIG. 1, in step 1, UE detects occurrence of an RLF. Preferably, the RLF refers to an RLF of an MCG. The UE considers that an RLF is detected in the following cases:

Case 1: A timer T310 used for radio link failure detection expires.

Case 2: A timer T312 used for radio link failure detection expires.

Case 3: An indication of a random access problem from a MAC layer is received, and at this time, none of timers T300, T301, T304, T311, and T319 is in a running state. These timers are respectively used to monitor an RRC connection establishment procedure, an RRC connection re-establishment procedure, a handover procedure, and a cell re-selection procedure and an RRC connection recovery procedure in an RRC re-establishment procedure.

Case 4: An indication indicating that the maximum number of retransmissions has been reached is received from the RLC layer.

In step 2, the UE stores radio link failure information in an RLF report. As an example, the UE may store the radio link failure information in a variable VarRLF-Report corresponding to the RLF report.

The radio link failure information may be set, for example, in the manner described below.

If the UE has performed a handover procedure before the RLF, a field is set, and includes: information for indicating the type (scenario) of the handover procedure; a previous-PCellId information element set to the global cell identity and the tracking area code of the (primary) cell where the latest handover command was received; and a timeConnFailure information element set to an elapsed time starting from reception of the latest handover command.

Preferably, that the UE has performed a handover procedure before the RLF may also be further described as: if a handover command (e.g., an RRC reconfiguration message including a synchronized reconfiguration information element) was received before the link failure (RLF), and if the most recently received handover command is for an intra-NR handover. Considering that time points of receiving a CHO command and executing the CHO command may be different in the CHO scenario, the description of obtaining (receiving) the handover command may also include executing the CHO command in the CHO case.

The information for indicating the type of the handover procedure may indicate that the type of the handover procedure is a CHO, a DAPS handover, or a legacy handover. Preferably, if the information for indicating the type of the handover procedure is not present, it is considered that the corresponding handover procedure is the legacy handover, that is, not the CHO or the DAPS handover. If the handover procedure performed by the UE before the RLF is a CHO, the information for indicating the type of the handover procedure is set to indicate a CHO (conditional reconfiguration). In this case, the received handover command is equivalent to the executed CHO command (conditional reconfiguration). If the handover procedure performed by the UE before the RLF is a DAPS handover, the information for indicating the type of the handover procedure is set to indicate a DAPS handover. In this case, the received handover command is equivalent to the received handover command in which an arbitrary data radio bearer (DRB) configured to be a DAPS bearer is present in the configuration therein. Optionally, the type of the handover procedure may also be used to indicate that the handover procedure is a conditional handover for link recovery. That is, the handover procedure is performed when the cell selected in the cell selection procedure after the link failure is a conditional candidate cell, which can also be described as that the handover procedure is due to execution of the conditional handover link recovery function.

Optionally, the UE does not always include the information for indicating the type of the handover procedure in the RLF report. Instead, only when a condition is met, is the information for indicating the type of the handover procedure included in the RLF report. For example, the UE receives a time threshold configuration Th from the network side via an RRC message such as an RRC connection reconfiguration message. Only when the UE determines that a time indicated by a timeConnFailure information element is less than or is less than or equal to Th, does the UE include the information for indicating the type of the handover procedure in the RLF report. Conversely, when the UE determines that the time indicated by the timeConnFailure information element is greater than or is greater than or equal to Th, the UE does not include the information for indicating the type of the handover procedure in the RLF report. That is, only when the UE determines that the RLF may be related to the most recently executed handover procedure, is the information of the type of the handover procedure included in the RLF report. Optionally, the threshold Th is a predefined fixed value, such as 1 s.

Additionally, the UE further includes the following in the RLF report:

A failed cell identity (e.g., a failedPCellId information element) is set to a cell identity of a (primary) cell where the RLF is detected. If a global cell identity and a tracking area code corresponding to the cell are available, then the cell identity is set to the global cell identity and the tracking area code. Otherwise, the cell identity is set to a physical cell identity and a carrier frequency corresponding to the cell.

A connection failure type (connectionFailureType) information element is set to rlf.

A UE identity C-RNTI is set to the C-RNTI used by the UE in the primary cell.

The method described in this embodiment allows a network side to acquire the type of a handover undergone by UE before an RLF failure, thereby enabling more accurate adjustment and setting of mobility parameters.

EMBODIMENT 2

As mentioned earlier, if a handover failure has occurred (T304 has expired), and if the handover is a DAPS handover, that is, the UE is configured with a DAPS bearer, then an RRC re-establishment procedure is not performed immediately in this case, and instead, it is determined whether an RLF has been detected at a source primary cell (PCell). If no RLF is detected at the source PCell, the UE releases configurations related to a target cell, and falls back to the source PCell. The UE initiates a failure information procedure to transmit a failure information message to the source PCell so as to report a current DAPS handover failure to the network side and fall back to the source cell.

It can be seen that if the above-described DAPS handover fails, different from the case in which the UE needs to store an RLF report after a legacy handover fails, the UE does not store the RLF report when the UE falls back to the source PCell after the DAPS handover fails. The network side can only learn from the failure information message (FailureInformation message) that the UE has experienced a DAPS handover failure, but cannot acquire other failure information. In this embodiment, in the above-described case, that is, when the UE has experienced a DAPS failure and fallen back to the source PCell, the following failure information is included in the failure information message so that the network side can acquire more handover failure information, thereby performing more accurate network parameter optimization. The failure information includes: information of a random access procedure in the DAPS handover procedure; measurement results of a handover source PCell and a neighboring cell.

Setting of the information of the random access procedure includes:

setting an absoluteFrequencyPointA information element for indicating an absolute frequency of a reference resource block associated with a random access resource;

setting a locationAndBandwidth information element and a subcarrierspacing information element associated with corresponding information of an uplink bandwidth part (BWP) of the random access resource.

Setting msg1-FrequencyStart, msg1-FDM, and msg1-sbcarrierSpacing information elements for indicating the frequency domain information where the preamble used by the contention based random access resource is located.

Setting msg1-FrequencyStartCFRA, msg1-FDMCFRA, and msg1-sbcarrierSpacingCFRA information elements for indicating the frequency domain information where the preamble used by the contention free random access resource is located.

Setting information in a random access attempt list per-RAinfoList information element according to a chronological order of each random access attempt:

if the used random access resource is associated with a synchronization physical broadcast channel block (SS/PBCH), setting an ssb-index information element to include an index value of the synchronization physical broadcast channel block that the random access resource is associated with; setting a numberOfPreambleSentOnSSB information element to indicate the number of consecutive random access attempts associated with the synchronization physical broadcast channel block; for each random access attempt, when the random access attempt occurs on the contention based random access resource, and the random access procedure is not used to request for other system information (that is, an raPurpose information element is not requestForOtherSI), if the transmitted preamble contention resolution does not succeed, then setting a contentionDetected information element to true, or otherwise, setting the same to false; if the random access attempt uses the contention based random access resource, and if reference signal received power (RSRP) of the synchronization physical broadcast information block is greater than a set threshold rsrp-ThresholdSSB, then UE setting a dlRSRPAboveThreshold information element to true, or otherwise, setting the same to false.

If the used random access resource is associated with a channel state indicator reference signal (CSI-RS), setting a csi-RS-index information element to include an index value of the CSI-RS associated with the random access resource; setting a numberOfPreambleSentOn CSI-RS information element to indicate the number of consecutive random access attempts associated with the CSI-RS.

The measurement results of the handover source PCell and the neighboring cell include:

setting a measResultListNR information element in a measResultNeighCells information element to include measurement quantities (reference signal received power (RSRP) or reference signal received quality (RSRQ) or signal to interference pulse noise ratio (SINR)) of all available synchronization physical broadcast channel blocks (SS/PBCH) of best measured cells except the source PCell.

Setting a measResultListNR information element in a measResultNeighCells information element to include measurement quantities (reference signal received power (RSRP) or reference signal received quality (RSRQ) or signal to interference pulse noise ratio (SINR)) of all available channel state indicator reference signals (CSI-RS) of best measured cells except the source PCell.

Embodiment 3

Figure 5:
FIG. 5 shows a block diagram of user equipment (UE) according to the present disclosure.

In this embodiment, user equipment according to the present disclosure is described. FIG. 5 is a block diagram showing user equipment (UE) according to the present invention. As shown in FIG. 5, user equipment (UE) 50 includes a processor 501 and a memory 502. The processor 501 may include, for example, a microprocessor, a microcontroller, an embedded processor, and the like. The memory 502 may include, for example, a volatile memory (such as a random access memory (RAM)), a hard disk drive (HDD), a non-volatile memory (such as a flash memory), or other memories. The memory 502 stores program instructions. When the instructions are executed by the processor 501, various methods such as the above radio link failure reporting method and radio link failure setting method described in detail in the present invention can be performed.

In the present disclosure, some different embodiments can cooperate with each other. If not otherwise specified, concepts or definitions are applicable among the embodiments.

In the present disclosure, the term "base station" refers to a mobile communication data and control switching center with a larger transmit power and a wider coverage area, and has functions of resource distribution scheduling, data receiving and transmitting, and the like. The term "user equipment" refers to a user mobile terminal, for example, a terminal device capable of performing wireless communication with a base station or a micro base station, including a mobile phone, a notebook computer and the like.

The methods and related devices according to the present disclosure have been described above in conjunction with preferred embodiments. It should be understood by those skilled in the art that the methods shown above are only exemplary. The method according to the present disclosure is not limited to steps or sequences shown above. The base station and user equipment shown above may include more modules. For example, the base station and user equipment may further include modules that may be developed or will be developed in the future to be applied to a base station, an MME, or UE. Various identifiers shown above are only exemplary, not for limitation, and the present disclosure is not limited to specific information elements serving as examples of these identifiers. A person skilled in the art could make various alterations and modifications according to the teachings of the illustrated embodiments.

The program running on the device according to the present disclosure may be a program that enables a computer to implement the functions of the embodiments of the present disclosure by controlling a central processing unit (CPU). The program or information processed by the program may be temporarily stored in a volatile memory (for example, a random access memory (RAM)), a hard disk drive (HDD), a non-volatile memory (for example, a flash memory), or other memory systems.

The program for implementing the functions of the embodiments of the present disclosure may be recorded on a computer-readable recording medium. The corresponding functions may be achieved by reading programs recorded on the recording medium and executing them by the computer system. The phrase "computer system" herein may be a computer system embedded in the device, which may include operating systems or hardware (e.g., peripherals). The phrase "computer-readable recording medium" may refer to a semiconductor recording medium, an optical recording medium, a magnetic recording medium, a recording medium for programs that are dynamically stored for a short time, or any other recording medium readable by a computer.

Various features or functional modules of the device used in the above embodiments may be implemented or executed by circuits (for example, monolithic or multi-chip integrated circuits). The circuits designed to execute the functions described in the present specification may include a general-purpose processor, a digital signal processor (DSP), an application specific integrated circuit (ASIC), a field programmable gate array (FPGA) or other programmable logic devices, discrete gates or transistor logic, discrete hardware components, or any combination of the above. The general-purpose processor may be a microprocessor, or may be any existing processor, controller, microcontroller, or state machine. The circuit may be a digital circuit or an analog circuit. When new integrated circuit technologies that replace existing integrated circuits emerge because of the advances in semiconductor technology, one or a plurality of embodiments of the present disclosure may also be implemented using these new integrated circuit technologies.

Furthermore, the present disclosure is not limited to the embodiments described above. Although various examples of the described embodiments have been described, the present disclosure is not limited thereto. Fixed or non-mobile electronic devices installed indoors or outdoors, such as AV equipment, kitchen equipment, cleaning equipment, air conditioners, office equipment, vending machines, and other household appliances, may be used as terminal devices or communications devices.

The embodiments of the present disclosure have been described in detail above with reference to the accompanying drawings. However, the specific structures are not limited to the above embodiments. The present disclosure also includes any design modifications that do not depart from the substance of the present disclosure. In addition, various modifications may be made to the present disclosure within the scope of the claims. Embodiments resulted from the appropriate combinations of the technical means disclosed in different embodiments are also included within the technical scope of the present disclosure. In addition, components with the same effect described in the above embodiments may be replaced with one another.

The invention claimed is:

1. User equipment (UE), comprising:
a processor; and
a memory storing instructions,
wherein, on the basis of the instructions, the processor is configured to:
receive an RRC reconfiguration message including a synchronized reconfiguration information element;
detect a Radio Link Failure (RLF) for a Master Cell Group (MCG); and
store failure information in an RLF report, wherein
if the RRC reconfiguration message was received before the RLF and the last RRC reconfiguration message concerns a successful intra-NR handover, the failure information includes a field set to indicate a type of the successful intra-NR handover, wherein
if the successful intra-NR handover is a Dual Active Protocol Stack (DAPS) handover, the field is set to indicate the DAPS handover, and
if the successful intra-NR handover is a conditional handover, the field is set to indicate the conditional handover.

2. A method performed by user equipment (UE), the method comprising:
receiving an RRC reconfiguration message including a synchronized reconfiguration information element;
detecting a Radio Link Failure (RLF) for a Master Cell Group (MCG); and
storing failure information in an RLF report, wherein
if the RRC reconfiguration message was received before the RLF and the last RRC reconfiguration message concerns a successful intra-NR handover, the failure information includes a field set to indicate a type of the successful intra-NR handover, wherein
if the successful intra-NR handover is a Dual Active Protocol Stack (DAPS) handover, the field is set to indicate the DAPS handover, and
if the successful intra-NR handover is a conditional handover, the field is set to indicate the conditional handover.

* * * * *